United States Patent
Rosa et al.

(10) Patent No.: US 12,490,302 B2
(45) Date of Patent: Dec. 2, 2025

(54) COMMUNICATION IN THE UNLICENSED SPECTRUM

(71) Applicant: Nokia Technologies Oy, Espoo (FI)

(72) Inventors: Claudio Rosa, Randers (DK); Nuno Pratas, Gistrup (DK); Olli Alanen, Vantaa (FI); Mika Kasslin, Espoo (FI); Adrian Garcia Rodriguez, Santa Cruz de Tenerife (ES); Lorenzo Galati Giordano, Dublin (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 395 days.

(21) Appl. No.: 18/015,593

(22) PCT Filed: Jul. 13, 2020

(86) PCT No.: PCT/EP2020/069782
§ 371 (c)(1),
(2) Date: Jan. 11, 2023

(87) PCT Pub. No.: WO2022/012735
PCT Pub. Date: Jan. 20, 2022

(65) Prior Publication Data
US 2023/0254894 A1    Aug. 10, 2023

(51) Int. Cl.
| H04W 74/08 | (2024.01) |
| H04W 16/14 | (2009.01) |
| H04W 74/0808 | (2024.01) |

(52) U.S. Cl.
CPC ....... *H04W 74/0808* (2013.01); *H04W 16/14* (2013.01)

(58) Field of Classification Search
CPC ...... H04L 5/14; H04W 16/14; H04W 74/0808
See application file for complete search history.

(56) References Cited

U.S. PATENT DOCUMENTS 9,413,500 B2 *   8/2016  Chincholi ................. H04L 5/14
10,051,657 B2 *  8/2018  Yasukawa ......... H04W 72/1273
(Continued)

FOREIGN PATENT DOCUMENTS

| CN | 104507108 A | 4/2015 |
| CN | 105517166 A | 4/2016 |

(Continued)

OTHER PUBLICATIONS

Ericsson, 3GPP TSG-RAN WG1 Meeting #98bis, "DL signals and Channels for NR-U" R1-1912707, Reno, NV US [retrieved from Internet Nov. 9, 2019] 25 pages, XP51823551A1.

(Continued)

*Primary Examiner* — Alpus Hsu
(74) *Attorney, Agent, or Firm* — Lippes Mathias LLP (57) ABSTRACT

A node configured to support a method of communicating between two nodes in the unlicensed spectrum is disclosed where a channel can be simultaneously used for downlink and uplink communication. The method performed at a node involves assessing at that node, for example, a UE, that there is a transmission to be made to a further node, for example a gNB. The first node receives an indication that communication with the further node is supported on a channel within an unlicensed spectrum using flexible frequency division duplex (FDD) techniques. The first node determines whether transmission by the further node is being made within a first portion of the channel within the unlicensed spectrum; and if so, transmits to the further node within a second portion of the channel which does not overlap with the first.

20 Claims, 3 Drawing Sheets

(56) References Cited

U.S. PATENT DOCUMENTS

| | | | |
|---|---|---|---|
| 10,536,971 B2* | 1/2020 | Li | H04W 74/0816 |
| 10,886,976 B2* | 1/2021 | Rajagopal | H04B 7/0848 |
| 2018/0255578 A1 | 9/2018 | Kim et al. | |
| 2019/0150198 A1 | 5/2019 | Sun et al. | |
| 2019/0335456 A1 | 10/2019 | Yerramalli et al. | |
| 2019/0363843 A1* | 11/2019 | Gordaychik | H04W 72/044 |
| 2019/0380143 A1 | 12/2019 | Zhang et al. | |
| 2020/0045696 A1 | 2/2020 | Huang et al. | |
| 2020/0053772 A1* | 2/2020 | Pan | H04B 17/327 |
| 2020/0053798 A1 | 2/2020 | Tsai et al. | |
| 2020/0145125 A1* | 5/2020 | Wang | H04B 17/309 |
| 2020/0274656 A1* | 8/2020 | Gordaychik | H04L 1/1671 |

FOREIGN PATENT DOCUMENTS

| | | |
|---|---|---|
| CN | 106211350 A | 12/2016 |
| CN | 108781149 A | 11/2018 |
| CN | 111294806 A | 6/2020 |
| EP | 3 145 264 A1 | 3/2017 |
| WO | WO 2020068251 A1 | 4/2020 |

OTHER PUBLICATIONS

Wilus Inc. "Correction on Handling UL LBT Procedure under UE Power Limited Case", R1-1610460, 3GPP TSG-RAN WG1 Meeting #86bis, Lisbon Portugal Oct. 10-14, 2016, 3 pgs.

* cited by examiner

COMMUNICATION IN THE UNLICENSED SPECTRUM

TECHNOLOGICAL FIELD

Various example embodiments relate to communications within the unlicensed spectrum.

BACKGROUND

The unlicensed spectrum provides an opportunity to increase bandwidth available for signals to be transmitted within a network. Since the unlicensed spectrum is shared with other devices, scanning may be required prior to any transmission in order to mitigate interference within the unlicensed band. There may be rules regarding scanning performed by devices. Those rules may seek to allow the unlicensed spectrum to be fairly shared. The processes typically used within shared unlicensed spectrum can lead to an increase in latency.

The unlicensed spectrum is divided into sub-bands or channels each covering a predetermined range of frequency. Scanning procedures such as listen before talk (LBT) involve sensing a sub-band or channel to determine whether it is available prior to transmitting a signal. Where it is determined to be available the channel may be acquired by a node for a channel occupancy time (COT). During the COT signals may be sent by a node and other nodes are deterred from using the channel.

Increasingly devices are able to transmit and receive on more than one channel and this may be used to increase throughput and/or increase reliability. It is desirable to provide a system for communicating in the unlicensed spectrum in a manner which is both efficient and allows coexistence with other systems.

BRIEF SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to various, but not necessarily all, embodiments of the invention there is provided, according to a first aspect, a node, comprising means configured to: assess at the node that there is a transmission to be made to a further node; receive an indication that communication by the node with the further node is supported on a channel within an unlicensed spectrum using flexible frequency division duplex (FDD) techniques; determine whether transmission by the further node is being made within a first portion of the channel; and if so, transmit to the further node within a second portion of the channel which does not overlap with the first.

The mode of operation implemented by the node recognises that transmission by a node, for example, user equipment, may still be possible within a channel, even if a first frequency portion of that channel is being used for communication by a further node, for example, a gNB. In particular, the node can be configured to operate in a manner in which communication efficiency can be improved by determining whether transmission by the further node is being made within a first frequency portion of the channel; and if so, transmitting to the further node within a second frequency portion of the channel which does not overlap with the first frequency portion.

The indication that communication by the node with the further node is supported on a channel within an unlicensed spectrum using flexible frequency division duplex (FDD) techniques may comprise a broadcast or multicast communication from, for example, a gNB to all UE within a cell. The indication may comprise, for example, Physical Downlink Control Channel (PDCCH) messaging or signalling.

The node may comprise determination means configured to determine that if transmission by the further node is being made within a first portion of said channel, a specified duration of a listen before talk procedure implemented by the node prior to transmitting is reduced.

The node may comprise determination means configured to determine that if transmission by the further node is being made within a first portion of the channel, initialisation of listen before talk procedure prior to transmitting is prevented.

The node may comprise determination means configured to determine whether transmission by the further node is being made within a first portion of the channel by estimating, at the node, whether the further node is performing a transmission within a first portion of the channel.

The node may comprise estimation means configured to estimate by detecting one or more signature signal associated with the further node.

The one or more signature signal associated with the further node may comprise: a demodulation reference signal or channel state information reference signal.

The node may comprise estimation means configured to estimate by correlating a signal received at the node when communication by the node with the further node is supported on a channel within an unlicensed spectrum using flexible frequency division duplex (FDD) techniques with a signal received when communication on the channel is reserved for transmission by the further node.

The node may be configured such that when the indication that communication by the node with the further node is supported on the channel within an unlicensed spectrum using flexible frequency division duplex (FDD) techniques also indicates that communication on the channel immediately prior to a flexible slot is reserved for transmission by the further node, a specified duration of a listen before talk procedure prior to transmitting is reduced.

The node may be configured such that when the indication that communication by the node with the further node is supported on the channel within an unlicensed spectrum using flexible frequency division duplex (FDD) techniques also indicates that communication on the channel immediately prior to a flexible slot is reserved for transmission by the further node, initialisation of listen before talk procedure prior to transmitting is prevented.

The node may comprise means configured to assess a duration of the transmission to be made to the further node and transmit only if it is within a predetermined threshold.

The node may comprise means configured to assess a duration of the transmission to be made to the further node; means to determine at the node that the channel has been acquired by the further node for a predetermined occupancy time and means to transmit only if transmission to be made to the further node can be made within the predetermined occupancy time.

The node may comprise: means to assess a duration of the transmission to be made to the further node, and the indication that communication by the node with the further node is supported on a channel within an unlicensed spectrum using flexible frequency division duplex (FDD) techniques; means to assess whether transmission by the further node is supported in the first portion of said channel and, if so, means to transmit the transmission to be made within the second portion of the channel whilst transmission by the further node is supported in the first portion of the channel.

The indication that communication by the node with the further node is supported on a channel within an unlicensed spectrum using flexible frequency division duplex (FDD) techniques may comprise: a slot format indicator (SFI) message.

The node according may be such that the means comprise: at least one processor; and at least one memory including computer program code, the at least one memory and computer program code being configured to, with the at least one processor, cause the performance of the node.

According to various, but not necessarily all, embodiments of the invention there is provided, according to a second aspect, a method performed at a node, the method comprising: assessing at the node that there is a transmission to be made to a further node; receiving an indication that communication by the node with the further node is supported on a channel within an unlicensed spectrum using flexible frequency division duplexing (FDD) techniques; determining whether transmission by the further node is being made within a first portion of the channel; and if so, transmitting to the further node within a second portion of the channel which does not overlap with the first.

The method recognises that transmission by a node, for example, user equipment, may still be possible within a channel, even if a first frequency portion of that channel is being used for communication by a further node, for example, a gNB. In particular, the method recognises that communication efficiency can be improved by determining whether transmission by the further node is being made within a first frequency portion of the channel; and if so, transmitting to the further node within a second frequency portion of the channel which does not overlap with the first frequency portion.

The method may recognise that when it is determined that transmission by the further node is being made within a first portion of said channel, a specified duration of a listen before talk procedure implemented by the node prior to transmitting is reduced.

The use of the unlicensed spectrum may require scanning of channels before initiation of communication to allow for coexistence between various devices and networks using the spectrum. The scanning process increases latency and can itself cause additional issues, for example, a scanning process may require a device to wait until the unlicensed spectrum is idle for a regulated specified period of time before attempting to access the spectrum. That wait may be quite long if there are large numbers of devices in a neighbourhood. Listen before talk (LBT) is an example of such a scanning process.

The method may be such that when it is determined that transmission by the further node is being made within a first portion of the channel, initialisation of listen before talk procedure prior to transmitting is prevented.

The method may be such that determining whether transmission by the further node is being made within a first portion of the channel comprises: estimating, at the node, whether the further node is performing a transmission within a first portion of the channel.

The method may be such that estimating comprises: detecting one or more signature signal associated with the further node.

The method may be such that one or more signature signal associated with the further node comprises: a demodulation reference signal or channel state information reference signal.

The method may be such that estimating comprises: correlating a signal received at the node when communication by the node with the further node is supported on a channel within an unlicensed spectrum using flexible frequency division duplex (FDD) techniques with a signal received when communication on the channel is reserved for transmission by the further node.

The method may be such that when the indication that communication by the node with the further node is supported on the channel within an unlicensed spectrum using flexible frequency division duplex (FDD) techniques also indicates that communication on the channel immediately prior to a flexible slot is reserved for transmission by the further node, a specified duration of a listen before talk procedure prior to transmitting is reduced.

The method may be such that when the indication that communication by the node with the further node is supported on the channel within an unlicensed spectrum using flexible frequency division duplex (FDD) techniques also indicates that communication on the channel immediately prior to a flexible slot is reserved for transmission by the further node, initialisation of listen before talk procedure prior to transmitting is prevented.

The method may comprise: assessing a duration of the transmission to be made to the further node and transmitting only if it is within a predetermined threshold.

The method may comprise: assessing a duration of the transmission to be made to the further node; determining at the node that the channel has been acquired by the further node for a predetermined occupancy time and transmitting only if transmission to be made to the further node can be made within the predetermined occupancy time.

The method may comprise: assessing a duration of the transmission to be made to the further node, and the indication that communication by the node with the further node is supported on a channel within an unlicensed spectrum using flexible frequency division duplex (FDD) techniques, assessing whether transmission by the further node is supported in the first portion of said channel and, if so, transmitting the transmission to be made within the second portion of the channel whilst transmission by the further node is supported in the first portion of the channel.

The method may be such that the indication that communication by the node with the further node is supported on a channel within an unlicensed spectrum using flexible frequency division duplex (FDD) techniques comprises: a slot format indicator (SFI) message.

The method may be such that the indication that communication by the node with the further node is supported on a channel within an unlicensed spectrum using flexible frequency division duplex (FDD) techniques comprises: an indication that one or more slots are classified as for flexible use.

According to various, but not necessarily all, embodiments of the invention there is provided, according to a second aspect, a computer program comprising computer readable instructions which, when executed by a computer on a node, are configured to cause said node to perform a method as described above.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function. Additionally, it will be understood that means configured to perform a function encompass logic or circuitry configured to perform that function.

BRIEF DESCRIPTION

Some example embodiments will now be described with reference to the accompanying drawings in which.

DETAILED DESCRIPTION

Before discussing the example embodiments in any more detail, first an overview will be provided.

By way of background, it will be appreciated that unlicensed spectrum (new radio unlicensed NR-U) operation is such that a portion of frequency spectrum is shared between networks and devices, for example a mobile/wireless telecommunication network may share a region of frequency used for WiFi communication. There are various possibilities to enable different schemes to coexist within the unlicensed spectrum.

One sharing scheme implements a shared channel occupancy time (COT) between next generation NodeB (gNB) (as an initiating device) and user equipment (UE) (as a responding device). According to the scheme, time division duplex (TDD) operation is implemented. According to the TDD sharing approach a gNB and UE are configured to transmit on the same unlicensed channel/frequency band. A shared COT can mean that the next generation NodeB (gNB) (as initiating device) acquires the "right" to access a channel for a certain time period (channel occupancy time). That right is acquired by means of an "extended" listen before talk (LBT) procedure (known as cat4 LBT).

A COT may not prevent other devices from accessing the channel. Instead, the COT enables, for a limited time period, preferential access to the channel in relation to the initiating and responding devices. Specifically, a COT is typically acquired by an initiating device using LBT type 1 which requires that a target channel is unoccupied for a predetermined specific amount of time. The amount of time is associated with traffic priority of a payload to be transmitted by the initiating device. The higher the traffic priority, the lower is the amount of time the channel must be unoccupied in the LBT check.

COT acquisition is accomplished by an initiating device performing a transmission in the channel (after a successful LBT check). The initiating device can pause its transmission during the COT and then resume its transmission (while still within the COT) by performing a shorter LBT. If the COT has elapsed, then the initiating device has to begin acquisition of resource again. It will be appreciated that if an initiating device pauses its transmission, other devices maybe able to access the channel, provided they are able to successfully overcome their own LBT check.

An acquired COT can also be used by a responding device (i.e. the device responding to the initiating device transmission) to acquire the channel (to reply to the initiating device). The responding device may typically be required to implement their own LBT procedure before making a transmission.

Due to the asynchronous nature of access to a shared spectrum by different systems, it is possible that multiple devices taking the role of initiating device have a valid COT at the same time. In other words, even though a COT is valid, other devices can still access the same spectrum provided the first initiating device paused its transmission for long enough that another initiating device was also able to establish a COT.

If shared COT is acquired, the gNB can be configured to share the right to access the channel with its responding devices (UEs), provided their transmissions occur within the COT acquired by the gNB. Within that shared COT the UEs can apply a "reduced" LBT procedure, or no LBT at all.

The following LBT types are defined for uplink (UL) channel access in NR-U:
Type 1 (Cat4 LBT)—for UL transmissions outside the gNB-acquired COT
Type 2A (25 ms Cat2 LBT)—for UL transmissions within the gNB-acquired COT where the downlink (DL) to uplink gap is ≥25 ms, and for UL transmission following another UL transmission
Type 2B (16 ms Cat2 LBT)—for UL transmissions within the gNB-acquired COT but only to be used for UL transmissions following DL with a DL-UL gap exactly equal to 16 ms
Type 2C (no UL LBT)—can only be used for UL transmission following DL, where DL-UL gap ≤16 ms and the duration of the UL transmission ≤584 ms)

Other possible sharing schemes which can be implemented in NR-U are Frequency Division Duplexing (FDD) solutions for unpaired bands. Such solutions are needed to better fulfil the evolving Enhanced Ultra Reliable Low Latency Communication (eURLLC) and Time Synchronous Communication (TSC) use cases. Such solutions remove the undesirable restriction of traditional TDD for unpaired bands which prevent concurrent uplink and downlink transmission and therefore limit eURLLC/TSC performance especially in terms of communication latency.

Figure 1:
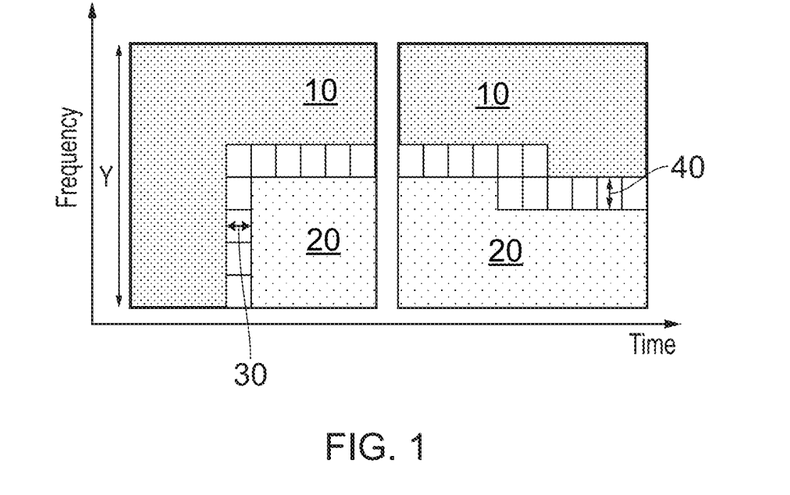
FIG. 1 illustrates schematically flexible frequency division duplex (FDD) methods.

FIG. 1 illustrates schematically flexible frequency division duplex (FDD) methods. As shown in FIG. 1, when operating to use a flexible FFD scheme a gNB is configured such that it can:
dynamically use a part of the spectrum for UL or DL transmissions; and
simultaneously transmit and receive on a band, assuming there is a minimum frequency separation between UL and DL (Rx/Tx Guard Band).

Flexible FDD allows for mitigation of latency associated with TDD operation within a sub-band, while avoiding the problem of intra-cell cross-link interference associated with in-band full duplex operation.

FIG. 1 illustrates schematically one sub-band or channel having a range of frequency Y, for example, 20 MHz. Downlink transmissions 10 and uplink transmissions 20 can be sent within the same frequency range Y, subject to implementation of appropriate guard bands in time 30 and frequency 40. The frequency guard band(s) 40 allow for sufficient separation in transmission and reception frequencies, to mitigate interference and signal to noise issues. The guard interval 30 may be variable to account for transmission and reception configuration changes and propagation delays.

Figure 2:
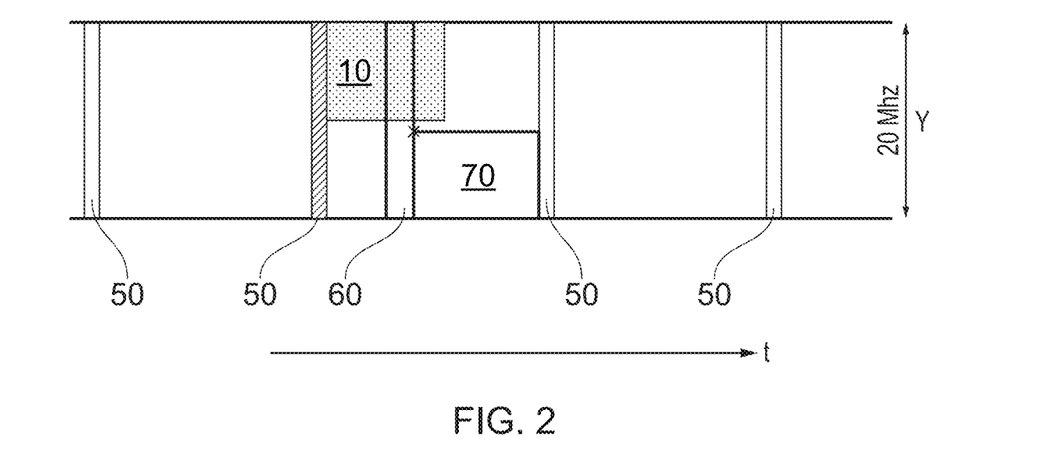
FIG. 2 illustrates one possible problem with FDD methods such as those illustrated in FIG. 1.

FIG. 2 illustrates one possible problem with FDD methods such as those illustrated in FIG. 1. When implementing a scheme for flexible FDD operation in unlicensed spectrum, one issue is that UE may still be required to perform UL LBT procedures (as described above in relation to TDD operation) prior to any UL transmission. Since, if using flexible FDD approaches, a gNB may be performing gapless DL transmission on at least part of an acquired sub-band, those DL transmissions may cause LBT failure at the UE. The regulations require a transmitter to perform LBT measurement on an entire sub-band (for example across an entire 20 MHz frequency band) even if a DL or UL transmission is only occupying part of that sub-band. As a result, even if a flexible FDD DL transmission occupies only part of the sub-band in the clear channel assessment (CCA) slots preceding an UL transmission (user equipment to Tx/Rx Guard Time), the probability of a UE sensing the channel as busy is still significant due to: high coupling gain between a UE and its serving gNB; and leakage from the serving gNB transmission to the rest of the band. Since the UE detects that the channel Y is not clear, it is unable to make an UL transmission. As shown in FIG. 2 a gNB may be able to inform UE within its cell of operational parameters, for example by means of a message 50 sent on the Physical Downlink Control Channel (PDCCH). A gNB may proceed to transmit 10 on a DL shared channel for example, a Physical Downlink Shared Channel (PDSCH). As shown in FIG. 2, that DL transmission 10 may only occupy part of the sub-band or channel Y. When a UE attempts an LBT procedure 60 across the entire channel Y, the DL transmission 10 is detected and the UE determines that it is unable to make an UL transmission, despite available resource 70 assuming a network is configured to use flexible FDD techniques.

Embodiments provide nodes configured to communicate channels in the unlicensed spectrum in a way such that latency in transmissions can be reduced and overall throughput may be increased. In particular, embodiments may enable flexible FDD UL transmissions in an unlicensed channel, where an UL transmission may start on a first part of the unlicensed channel while a DL transmission is ongoing on a (non-overlapping) second part of the unlicensed channel.

Embodiments introduce a UE implementation solution that does not require explicit signalling which may introduce further latency or network inefficiencies. The UE implementation-based embodiments are such that a UE is configured to: (i) estimate if the serving next generation NodeB (gNB) is performing a simultaneous DL transmission; and (ii) based on that estimation, decide which LBT type to apply. Such an estimation may be performed prior to performing UE UL transmission within a UL Configured Grant (CG) resource allocation. Embodiments recognise that scanning procedures, for example LBT procedures, increase latency and decrease overall efficiency. Embodiments may recognise that a node, such as a UE, within a network may use information available, sometimes with estimation and assessment techniques, to allow for communication within a flexible FDD scheme, without a need for explicit additional signalling.

It will be appreciated that regulated operation of flexible FDD within the unlicensed spectrum includes a Slot Format Indicator (SFI) which is communicated between a gNB and UE served by that gNB. The SFI is already present in the current specs for TDD operation and includes an indication of DL symbol, UL symbol and Flexible (F) symbol within a slot. The role of the flexible symbol is to indicate that the symbol can either take the role of UL or DL, or it can be used for switching between DL and UL (or vice versa). Embodiments of the invention may use information from the gNB when determining how a UE may operate.

Figure 3:
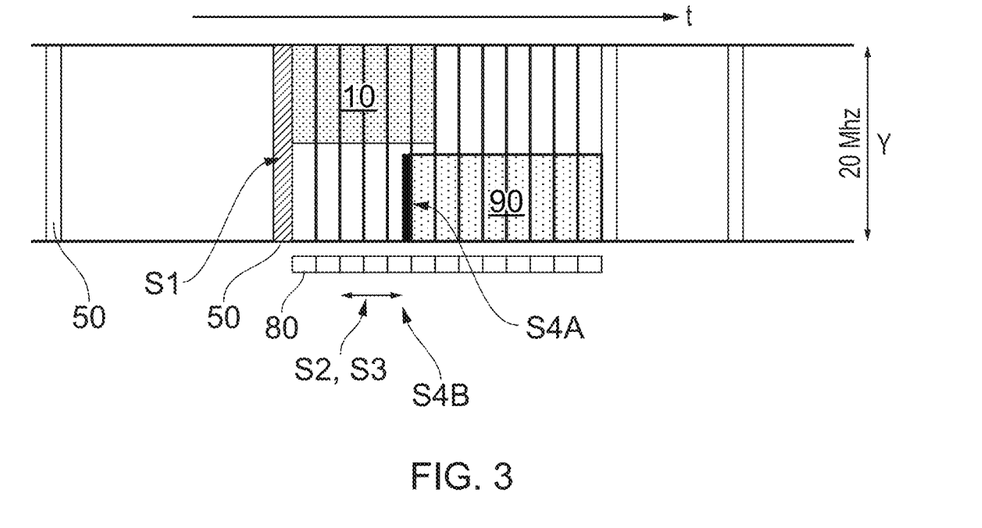
FIG. 3 illustrates schematically an example embodiment of the subject matter described herein.

FIG. 3 illustrates schematically an example embodiment of the subject matter described herein. According to the embodiment illustrated in FIG. 3 the following blocks may occur:

S1: A controlling node, such as a gNB, is configured to inform UE operating within a cell, via PDCCH signalling 50 of the type of communication direction each symbol within a grant has been allocated to. The direction may comprise an indication of downlink, uplink or flexible. The communication may occur via use of a SFI message 80 or other suitable broadcast or multicast communication method. This messaging by the gNB also serves as an indication to UE that the gNB has acquired a COT.

S2: User Equipment (with an UL configured grant (CG) allocation) receives the indication of symbol direction for example, by receiving an SFI, and is configured to interpret that indication and detect which symbols are marked as Flexible (F).

S3: In the symbols identified as F, the UE takes steps to detect whether the gNB is performing a DL transmission. That detection process may, for example, take one of the following forms: via Demodulation Reference Signal (DMRS); Channel Status Information Reference Signal (CSI-RS) Detection; and/or based on correlation with a signal in initial DL symbols.

S4A and S4B: In dependence upon the outcome of the detections block S3, the UE is configured to either:

S4A: Proceed with LBT Type 2C if the serving gNB has been identified as being a transmitter and the duration of the UL transmission is less than 0.584 ms and make UL transmissions 90 in an appropriate frequency range of the channel Y using the frequency available as a Physical Uplink Shared Channel (PUSCH); or S4B: Proceed with LBT Type 2A if either:
no transmission was detected; or
the serving gNB was not identified as being the transmitter; or
the duration of the UL transmission to be made by the UE is more than 0.584 ms in duration Without use of methods in accordance with embodiments, flexible FDD within the unlicensed spectrum can occur if a gNB is configured to introduce at least one gap between two consecutive DL transmissions in order to allow a potential UE to be able to perform a successful LBT check and be able to proceed with its UL transmission. These gaps on the DL transmission waste available resource which could otherwise be used for communication. Embodiments can allow flexible FDD operation with DL transmission which does not need to be interrupted or disrupted in order to allow the UE to perform LBT procedures prior to the UE UL transmission. In particular, a gNB can perform DL on a first part of an unlicensed channel and DL to UL switch on a second part of the same unlicensed channel, without requiring an introduction of additional signalling. In other words, some embodiments may allow for use of a reduced, or no, scanning procedure before a UE begins transmission.

Embodiments may be particularly useful in relation to UL configured grant allocations, where UE is assigned periodic semi-static Physical Uplink Shared Channel (PUSCH) therefore the gNB is unable to specifically indicate a LBT type when allocating those PUSCH resources. However, it will be appreciated that embodiments can also apply to scheduled PUSCH transmission, especially scheduled PUSCH transmissions outside the gNB-acquired COT.

Figure 4:
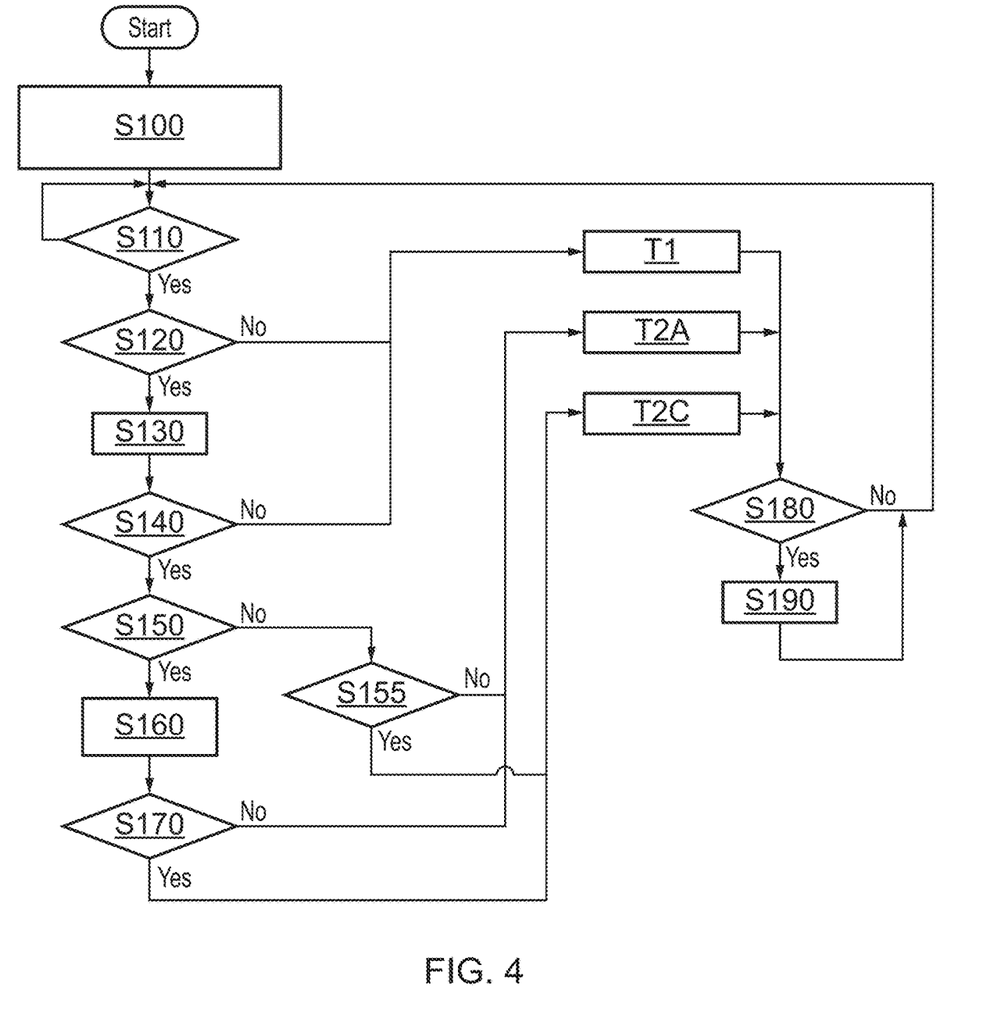
FIG. 4 illustrates, as a flowchart, operational blocks according to one exemplary implementation.

FIG. 4 illustrates, as a flowchart, operational blocks performed by UE to select an appropriate transmission regime or LBT procedure according to one exemplary implementation.

S100: UE determines that it has a Physical Uplink Shared Channel PUSCCH transmission to make, starting in symbol #x of slot #N; ending in symbol #y of slot #M, the UE has an initial LBT type of Type 1 LBT (Cat4) (for example, as associated with an UL Configured Grant or a scheduled PUSCH outside a gNB acquired COT)

S110: Is it slot N? if Yes, proceed to S120.

S120: The UE checks for downlink control information (DCI), for example, as sent on a PDCCH. That DCI can include a Slot Format Indicator (SFI) message and COT from a serving gNB.

If no such messaging is detected at the UE, the UE is configured to implement LBT, type 1 (cat4) T1

If messaging is detected, the UE proceeds to block S130.

S130: UE decodes and processes the SFI message and identifies F slots, then proceeds to block S140.

S140: The UE operates to determine whether symbol #y of slot #M within the determined COT?

If not, the UE is configured to implement LBT, type 1 (cat4) T1

If yes, the UE proceeds to block S150.

S150: The UE operates to determine whether there is at least one type F slot preceding the symbol #x.

If not, the UE is configured to determine S155 whether the preceding slot was of type D:

If not, the UE is configured to implement LBT, type 2A (cat2) T2A

If yes, the UE is configured to implement LBT, type 2C (no LBT) T2C

If S150 reveals there is at least one type F slot preceding the symbol #x, then the UE proceeds to block S160.

S160: The UE is configured to attempt detection of DL transmissions from the serving gNB, detection methods employed may be any of those set out in more detail below.

S170: The UE us configured to determine whether a DL transmission from a serving gNB was detected at block S160.

If not, the UE is configured to implement LBT, type 2A (cat2) T2A

If yes, the UE is configured to implement LBT, type 2C (no LBT) T2C

S180: Once an appropriate LBT type has been selected by the UE (T1, T2A, T2C) in relation to the PUSCH transmission of interest, the UE performs that LBT procedure. And determines whether the result of the LBT procedure is positive. If so, the UE proceeds to perform an uplink transmission at S190. If the result of the LBT procedure is not positive the process begins again.

UE Detection of DL Transmission

The detection by UE of the presence of a DL transmission from the serving gNB may be achieved in various ways. For example, detection can be via the detection of specific DL DMRS ports/sequences; CSI-RS Detection, and/or based on correlation of a signal present in slots identified as F with a signal present in slots identified with D, for example, whenever there is a D present either within the same slot or within k previous slots still within the correlation time of the channel at the UE receiver.

Varying UL Transmission Duration in LBT Type 2C

According to some channel access regulations, when UE applies LBT Type 2C, then the duration of its UL transmission is limited to ≤584 µs. In flexible FDD operation if a DL transmission is still ongoing and UE is aware of the ongoing transmission, the UE might be able to extend its transmission beyond 584 µs, thereby increasing efficiency and throughput. Whilst improving efficiency, simply extending an UL transmission might have unintended consequences where there is a "hidden node". By extending the UE UL transmission the UE would limit channel access of any hidden node because the hidden node would fail its own LBT procedure. In order to cope with this, some embodiments may require the UE to perform sensing across the channel in order to estimate the presence of potential hidden nodes. That sensing may occur prior to an UL transmission. The sensing period can be enabled within gNB silent periods in time and/or frequency domains. For example, in some embodiments the UE could measure the power in the empty frequency resources that precede an uplink transmission and for LBT power sensing purposes, interpolate that power across the channel size in a conservative manner to account for the potential presence of hidden nodes. In other words, UE can perform hidden node sensing in known periods when the gNB is not performing any DL transmissions. Extension of an UL transmission may be enabled or prevented on the basis of the channel estimation result. In the case that a degree of certainty of presence of a hidden node is above a certain threshold, then the UE can be prevented from transmit beyond 584 µs. In the case that a degree of certainty of presence of a hidden node is below a certain threshold, then the UE can be allowed to transmit beyond 584 µs.

A person of skill in the art would readily recognize that blocks of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A node, comprising:
   at least one processor; and
   at least one memory including computer program code, said at least one memory and computer program code being configured to, with said at least one processor, cause the node to:
   assess at said node that there is a transmission to be made to a further node;
   receive an indication that communication by the node with the further node is supported on a channel within an unlicensed spectrum using flexible frequency division duplex (FDD) techniques;
   determine whether transmission by the further node is being made within a first frequency portion of said channel; and if so,
   transmit to said further node within a second frequency portion of said channel which does not overlap with the first frequency portion.

2. A node according to claim 1, wherein when it is determined that the transmission by the further node is being made within a first frequency portion of said channel, a specified duration of a listen before talk procedure prior to transmitting is reduced.

3. A node according to claim 1, wherein when it is determined that the transmission by the further node is being made within a first frequency portion of said channel, initialisation of listen before talk procedure prior to transmitting is prevented.

4. A node according to claim 1, wherein to determine whether the transmission by the further node is being made within a first frequency portion of said channel, the node is configured to estimate whether the further node is performing the transmission within a first frequency portion of said channel.

5. A node according to claim 4, wherein estimating comprises: detecting one or more signature signals associated with said further node.

6. A node according to claim 5, wherein said one or more signature signals associated with said further node comprises: a demodulation reference signal or channel state information reference signal.

7. A node according to claim 4, wherein estimating comprises: correlating a signal received at said node when communication by the node with the further node is supported on a channel within an unlicensed spectrum using flexible frequency division duplex (FDD) techniques with a signal received when communication on the channel is reserved for the transmission by the further node.

8. A node according to claim 1, wherein when the indication that communication by the node with the further node is supported on the channel within an unlicensed spectrum using flexible frequency division duplex (FDD) techniques also indicates that communication on the channel immediately prior to a flexible slot is reserved for the transmission by the further node, a specified duration of a listen before talk procedure prior to transmitting is reduced.

9. A node according to claim 1, wherein when the indication that communication by the node with the further node is supported on the channel within an unlicensed spectrum using flexible frequency division duplex (FDD) techniques also indicates that communication on the channel immediately prior to a flexible slot is reserved for the transmission by the further node, initialisation of listen before talk procedure prior to transmitting is prevented.

10. A node according to claim 1, wherein said at least one memory and computer program code are configured to, with said at least one processor, cause the node to assess a duration of the transmission to be made to the further node and transmit only if it is within a predetermined threshold.

11. A node according to claim 1, wherein said at least one memory and computer program code are configured to, with said at least one processor, cause the node to assess a duration of the transmission to be made to the further node; determine at said node that the channel has been acquired by said further node for a predetermined occupancy time and transmit only if the transmission to be made to the further node can be made within the predetermined occupancy time.

12. A node according to claim 1, wherein said at least one memory and computer program code are configured to, with said at least one processor, cause the node to:
   assess a duration of the transmission to be made to the further node, and said indication that communication by the node with the further node is supported on a channel within an unlicensed spectrum using flexible frequency division duplex (FDD) techniques, assess whether the transmission by the further node is supported in said first frequency portion of said channel and, if so, transmit said transmission to be made within said second frequency portion of said channel whilst the transmission by the further node is supported in said first frequency portion of said channel.

13. A method performed at a node, said method comprising:
   assessing at said node that there is a transmission to be made to a further node;
   receiving an indication that communication by the node with the further node is supported on a channel within an unlicensed spectrum using flexible frequency division duplex (FDD) techniques;
   determining whether transmission by the further node is being made within a first frequency portion of said channel; and if so,
   transmitting to said further node within a second frequency portion of said channel which does not overlap with the first frequency portion.

14. A method according to claim 13, wherein when it is determined that the transmission by the further node is being made within a first frequency portion of said channel, a specified duration of a listen before talk procedure prior to transmitting is reduced.

15. A method according to claim 13, wherein when it is determined that the transmission by the further node is being made within a first frequency portion of said channel, initialisation of listen before talk procedure prior to transmitting is prevented.

16. A method according to claim 13, wherein to determine whether the transmission by the further node is being made within a first frequency portion of said channel, the node is configured to estimate whether the further node is performing the transmission within a first frequency portion of said channel.

17. A method according to claim 13, wherein when the indication that communication by the node with the further node is supported on the channel within an unlicensed spectrum using flexible frequency division duplex (FDD) techniques also indicates that communication on the channel immediately prior to a flexible slot is reserved for the transmission by the further node, a specified duration of a listen before talk procedure prior to transmitting is reduced.

18. A method according to claim 13, wherein when the indication that communication by the node with the further node is supported on the channel within an unlicensed spectrum using flexible frequency division duplex (FDD) techniques also indicates that communication on the channel immediately prior to a flexible slot is reserved for the transmission by the further node, initialisation of listen before talk procedure prior to transmitting is prevented.

19. A method according to claim 13, comprising causing the node to assess a duration of the transmission to be made to the further node and transmit only if it is within a predetermined threshold.

20. A non-transitory computer-readable medium storing computer program code including instructions that, when executed by a processor, causes a node to:
- assess at said node that there is a transmission to be made to a further node;
- receive an indication that communication by the node with the further node is supported on a channel within an unlicensed spectrum using flexible frequency division duplex (FDD) techniques;
- determine whether transmission by the further node is being made within a first frequency portion of said channel; and if so,
- transmit to said further node within a second frequency portion of said channel which does not overlap with the first frequency portion.

\* \* \* \* \*